United States Patent
Nissim Kobliner et al.

(10) Patent No.: US 11,023,594 B2
(45) Date of Patent: Jun. 1, 2021

(54) LOCALLY PRIVATE DETERMINATION OF HEAVY HITTERS

(71) Applicants: Georgetown University, Washington, DC (US); President and Fellows of Harvard College, Cambridge, MA (US); The Regents of the University of California, Oakland, CA (US)

(72) Inventors: Yaacov Nissim Kobliner, Brookline, MA (US); Uri Stemmer, Cambridge, MA (US); Raef Bahi Youssef Bassily, San Diego, CA (US); Abhradeep Guha Thakurta, Santa Cruz, CA (US)

(73) Assignee: Georgetown University, Washington, DC (US)

( * ) Notice: Subject to any disclaimer, the term of this patent is extended or adjusted under 35 U.S.C. 154(b) by 240 days.

(21) Appl. No.: 15/986,734

(22) Filed: May 22, 2018

(65) Prior Publication Data

US 2018/0336357 A1 Nov. 22, 2018

Related U.S. Application Data

(60) Provisional application No. 62/509,630, filed on May 22, 2017.

(51) Int. Cl.
*G06F 21/60* (2013.01)
*H04L 9/06* (2006.01)
*G06F 21/62* (2013.01)

(52) U.S. Cl.
CPC ........ *G06F 21/602* (2013.01); *G06F 21/6245* (2013.01); *H04L 9/0643* (2013.01); *H04L 2209/08* (2013.01)

(58) Field of Classification Search
CPC . G06F 21/602; G06F 21/6245; H04L 9/0643; H04L 2209/08
See application file for complete search history.

(56) References Cited

U.S. PATENT DOCUMENTS 6,931,403 B1 * 8/2005 Agrawal ............. G06F 21/6245
707/752
9,342,705 B1 * 5/2016 Schneider ................. H04L 9/14
(Continued)

OTHER PUBLICATIONS

Apple Differential Privacy Team, "Learning with Privacy at Scale", https://machinelearning.apple.com/docs/learning-with-privacy-at-scale/appledifferentialprivacysystem.pdf, 25 pages, downloaded Dec. 7, 2017.

(Continued)

*Primary Examiner* — Samson B Lemma
*Assistant Examiner* — Zoha Piyadehghibi Tafaghodi
(74) *Attorney, Agent, or Firm* — Klarquist Sparkman, LLP

(57) ABSTRACT

Technologies are disclosed for computing heavy hitter histograms using locally private randomization. Under this strategy, "agents" can each hold a "type" derived from a large dictionary. By performing an algorithm, an estimate of the distribution of data can be obtained. Two algorithms implement embodiments for performing methods involving differential privacy for one or more users, and usually are run in the local model. This means that information is collected from the agents with added noise to hide the agents' individual contributions to the histogram. The result is an accurate enough estimate of the histogram for commercial or other applications relating to the data collection of one or more agents. Specifically, the proposed algorithms improve on the performance (measured in computation and memory requirements at the server and the agent, as well as communication volume) of previously solutions.

15 Claims, 9 Drawing Sheets

(56) References Cited

U.S. PATENT DOCUMENTS

| | | | |
|---|---|---|---|
| 9,378,382 B1* | 6/2016 | Swamidass | G06F 21/6245 |
| 9,594,741 B1 | 3/2017 | Thakurta et al. | |
| 9,703,664 B1* | 7/2017 | Alshawabkeh | G06F 11/3414 |
| 2005/0131946 A1* | 6/2005 | Korn | H04L 63/1458 |
| 2005/0138110 A1* | 6/2005 | Redlich | G06F 21/6209 |
| | | | 709/201 |
| 2009/0073891 A1* | 3/2009 | Duffield | H04L 63/1408 |
| | | | 370/252 |
| 2010/0034202 A1* | 2/2010 | Lu | H04L 45/742 |
| | | | 370/392 |
| 2010/0174670 A1* | 7/2010 | Malik | G06F 16/35 |
| | | | 706/12 |
| 2013/0104251 A1* | 4/2013 | Moore | G06F 21/602 |
| | | | 726/30 |
| 2014/0079297 A1* | 3/2014 | Tadayon | G06K 9/00288 |
| | | | 382/118 |
| 2016/0294781 A1* | 10/2016 | Ninan | G06F 21/6245 |
| 2016/0300252 A1* | 10/2016 | Frank | G06F 16/24578 |
| 2017/0149793 A1* | 5/2017 | Spertus | H04L 41/069 |

OTHER PUBLICATIONS

Bassily et al., "Local, private, efficient protocols for succinct histograms," in *Proceedings of the Forty-Seventh Annual ACM Symposium on Theory of Computing*, pp. 127-135, ACM, Jun. 14-17, 2015.

Bassily et al., "Practical locally private heavy hitters," in *Advances in Neural Information Processing Systems*, pp. 2285-2293, Dec. 2017.

Beimel et al., "Private learning and sanitization: Pure vs. approximate differential privacy," in *Approximation, Randomization, and Combinatorial Optimization. Algorithms and Techniques*, pp. 363-378, 2013.

Bellare et al., "Randomness-efficient oblivious sampling," in *Proceedings of the 35th Annual Symposium on Foundations of Computer Science*, pp. 276-287, IEEE, 1994.

Bun et al., "Differentially private release and learning of threshold functions," in *IEEE 56th Annual Symposium on Foundations of Computer Science*, pp. 634-649, IEEE, 2015.

Bun et al., "Heavy hitters and the structure of local privacy," arXiv preprint arXiv:1711.04740, 2017.

Chan et al., "Optimal lower bound for differentially private multi-party aggregation," in *The 20th Annual European Symposium on Algorithms*, pp. 277-288, 2012.

Charikar et al., "Finding frequent items in data streams," in *International Colloquium on Automata, Languages, and Programming*, pp. 693-703, 2002.

Cormode et al. "An improved data stream summary: the count-min sketch and its applications," *Journal of Algorithms* 55(1): 58-75, Apr. 1, 2005.

Differential Privacy Team, "Learning with Privacy at Scale", *Apple Machine Learning Journal*, vol. 1, Issue 8, https://machinelearning.apple.com/2017/12/06/learning-with-privacy-at-scale.html; 12 pages, Dec. 2017.

Dwork et al., "Calibrating noise to sensitivity in private data analysis," in *Theory of Cryptography Conference*, pp. 265-284, 2006.

Erlingsson et al., "Rappor: Randomized aggregatable privacy-preserving ordinal response," in *Proceedings of the 2014 ACM SIGSAC Conference on Computer and Communications Security*, pp. 1054-1067, ACM, 2014.

Evfimievski et al., "Limiting privacy breaches in privacy preserving data mining," in *Proceedings of the Twenty-Second ACM SIGMOD-SIGACT-SIGART Symposium on Principles of Database Systems*, pp. 211-222, ACM, 2003.

Fanti et al., "Building a RAPPOR with the unknown: Privacy-preserving learning of associations and data dictionaries," *Proceedings on Privacy Enhancing Technologies* 3: 41-61, 2016.

Guruswami, "List Decoding of Error-Correcting Codes," PhD thesis, Massachusetts Institute of Technology, 2001. Supervisor-Madhu Sudan.

Hsu et al., "Distributed private heavy hitters," in *International Colloquium on Automata, Languages, and Programming*, pp. 461-472, 2012.

Kasiviswanathan et al., "What can we learn privately?," *SIAM Journal on Computing* 40(3): 793-826, Jun. 23, 2011.

Mishra et al., "Privacy via pseudorandom sketches," in *Proceedings of the Twenty-Fifth ACM SIGMOD-SIGACT-SIGART Symposium on Principles of Database Systems*, pp. 143-152, ACM, 2006.

Nissim et al., "Clustering algorithms for the centralized and local models," arXiv preprint arXiv: 1707.04766, 2017.

Qin et al., "Heavy hitter estimation over set-valued data with local differential privacy," in *Proceedings of the 2016 ACM SIGSAC Conference on Computer and Communications Security*, pp. 192-203, ACM, 2016.

Smith et al., "Is interaction necessary for distributed private learning?," In *Security and Privacy (SP), 2017 IEEE Symposium on Security and Privacy (SP)*, pp. 58-77. IEEE, May 2017.

\* cited by examiner

LOCALLY PRIVATE DETERMINATION OF HEAVY HITTERS

RELATED APPLICATONS

This application claims priority under 35 U.S.C. § 119(e) of U.S. Patent Application No. 62/509,630, filed May 22, 2017, and entitled, "SYSTEMS AND METHODS FOR IMPROVING DATA PRIVACY USING DISTRIBUTED PRIVATE HISTOGRAMS," which is incorporated herein by reference.

ACKNOWLEDGMENT OF GOVERNMENT SUPPORT

This invention was made with government support under grant no. 1565387 awarded by the National Science Foundation (NSF). The government has certain rights in the invention.

FIELD

This application relates to the field of cryptography, and generally to the usage of differential privacy algorithms in general. More specifically, this specification applies to the use of distributed private histograms.

BACKGROUND

A broader and deeper understanding of how people use their internet-connected devices may be of great value for improving user experiences. Although this understanding will typically represent broad averages and groupings of user selections over many millions of users (e.g., emoji's, URLs, music selections, etc.), collection of this data may typically be based on data provided by millions of individual users, each of whom has an interest in maintaining some level of privacy with respect to data concerning their personal selections. Thus, we are faced with two somewhat conflicting, and, in today's society, increasingly contentious, requirements: 1) acquisition, display and analysis of user data applicable to characterizing user's experiences, while simultaneously 2) preserving the individual privacy of each user during and after a data acquisition process.

The first requirement may be displayed in the form of a frequency histogram, e.g., a histogram quantifying the number of times each emoji in multiplicity of emoji's is found in user e-mails sent to and from an e-mail hosting site. Typically, only a small subset of the total number of "bins" in the histogram are of interest—these are the "heavy hitters" representing those elements (e.g., emoji's) occurring most frequently. Other emoji's found more infrequently in e-mails may then be ignored and a histogram only containing the heavy hitters may be generated.

The second requirement to preserve user security may be addressed, with only a minor loss in utility with respect to the first requirement, through the use of local differential privacy—processes for deleting personally-identifying data before sending the user information (e.g., the particular emoji chosen for an e-mail) coupled with an addition of random "noise" to individual user data prior to transmission from the client (user) to a central server (at Google, Apple, Facebook, etc.). Further increases in privacy protection are typically required, however, in today's environment of malicious hackers and a general lack of rules, or weak enforcement of rules, governing internet usage.

Differential privacy is a relatively new field in cryptography and computer science that aims to provide techniques to allow companies to ascertain trends between groups of individuals based on factors such as online social activity, user similarities, political or commerce-based interactions, browsing history, etc. with high accuracy. A further key objective of differential privacy, however, is to uncover this broad statistical information while simultaneously keeping the individual data from any given user (whose activity may have contributed to the statistical findings) anonymous, such that the user's individual information cannot be directly accessed by the company collecting the data, the user themselves, or any other third parties that may be interested in acquiring the data.

One practice that can aid this objective is to keep a user's personal information from being stored on a server at the company collecting the data. In this way, the user's personal data is not sensitively available on any of the company's hardware, or any other computing device other than the user's own personal computing device (such as a computer, cell phone, tablet, etc.). This method of data collection can be desirable for users who do not want their individual information to made available, with or without their consent, to any other entity (such as spamming networks, targeting retailers, phishing schemes, and the like).

One approach to achieving this outcome is to inject a random or pseudo-random "noise" signal into the data sent by each user to the server, wherein by averaging of this data over very large numbers of users, the collected statistical data can allow the company collecting the statistics to identify trends such as age, sex, race, political affiliations and information from various other online transactions while at the same time obscuring the identities of any particular individual. This approach can allow any specific element of the user's personal information to be hidden, thwarting any attempt to identify the user directly.

Due to the value of this strategy to both consumers and companies alike, numerous differential privacy algorithms have been proposed. However, some of these algorithms may be inefficient or, even worse, ineffective in achieving some of the above-noted objectives.

SUMMARY

The foregoing and other objects, features, and advantages of the technology will become more apparent from the following detailed description, which proceeds with reference to the accompanying figures.

Various companies exist that hold datasets of sensitive private information (for example, medical records, movie viewing, email usage, etc.). In many situations, these companies have an interest in providing global, statistical information about the data they have collected. Such a system is generally referred to as a statistical database. However, providing aggregate statistical information about the company's data may reveal some information about the individuals from who the data has been collected. In fact, various ad-hoc approaches to anonymizing public records have failed when researchers managed to identify personal information by linking two or more separately innocuous databases within or between companies. Differential privacy provides a framework for formalizing privacy in statistical databases, and has been introduced in order to protect against these kinds of de-anonymization techniques.

In this application, two algorithms are presented for computing histograms in what is generally referred to as the "local model." Under this strategy, "agents" can each hold a "type" derived from a large dictionary. By performing one or both of the algorithms, an estimate of the distribution of data (i.e., how many agents have any particular type) can be obtained. The algorithms reflect effective embodiments for performing methods involving differential privacy for one or more given users, and usually are run in the local model. This means that information is collected from the agents with added noise to hide the agents' individual contributions to the histogram (in particular, if the noisy data is subpoenaed, it would contain very little information about the individual agents). Nevertheless, the result is an accurate enough estimate of the histogram for commercial or other applications relating to the data collection of one or more agents. Specifically, the proposed algorithms improve on the performance (measured in computation and memory requirements at the server and the agent, as well as communication volume) of previously proposed related art algorithms.

DETAILED DESCRIPTION

The two algorithms for determining heavy hitters for a group of users (each user associated with a user device) are based on the following assumptions about the relative magnitudes of numbers of users, sets of the total possible types, and the expected number of heavy hitters:

1) The number of users, n, may range up into the tens of millions or more.

2) The total number of possible types (the set X) that the users may hold may be an enormous number. For example, if the types represent URLs which are accessible on the internet, the number may be many millions or more. If the types are all possible eight letter words in English, the number may literally by astronomical. The set X on its own may be public knowledge, but of no interest to internet companies, or other organizations, since it may contain almost entirely elements which no one is interested in—i.e., URLs which are visited by hardly anyone, or songs that are downloaded by almost no one.

3) The number of types which are actually held by the users is assumed to be a small subset of the set X. Thus, any approach to applying a frequency oracle directly on X (a "brute force approach") is impractical and inefficient since the great majority of elements in the set X will not be held by anyone among the total number, n, of users.

4) Even among the small subset of X held by users (#3, above), an even much smaller subset of X is held by an appreciable number of users—these are termed the "heavy hitters". Typically, internet companies are also not interested in the entire subset of X corresponding to types held by at least one user—only types held by a large number (typically In) will be of interest—e.g., URLs with many hits, or songs downloaded by many people, or new words used within many e-mails.

5) Thus, the goal for internet companies is to receive type data from users (which has been conveyed to the server by local differentially private randomization methods) and to efficiently determine the heavy hitters (#4, above) out of the larger number of types actually held by users (#3, above).

The basis for both algorithms, "TreeHist" and "Bitstogram", is the realization that to efficiently determine the heavy hitters from among the set X, or even the subset of all elements of X held by at least one user, that it is best to remove non-heavy hitter types as soon as possible during the various steps of a process to find the heavy hitters. Therefore, the technologies described herein provide advantages in terms of reducing the computing resources (e.g., computer memory resources, computer processing resources, computer storage resources, network resources, etc.) needed to identify heavy hitters.

Figure 1:
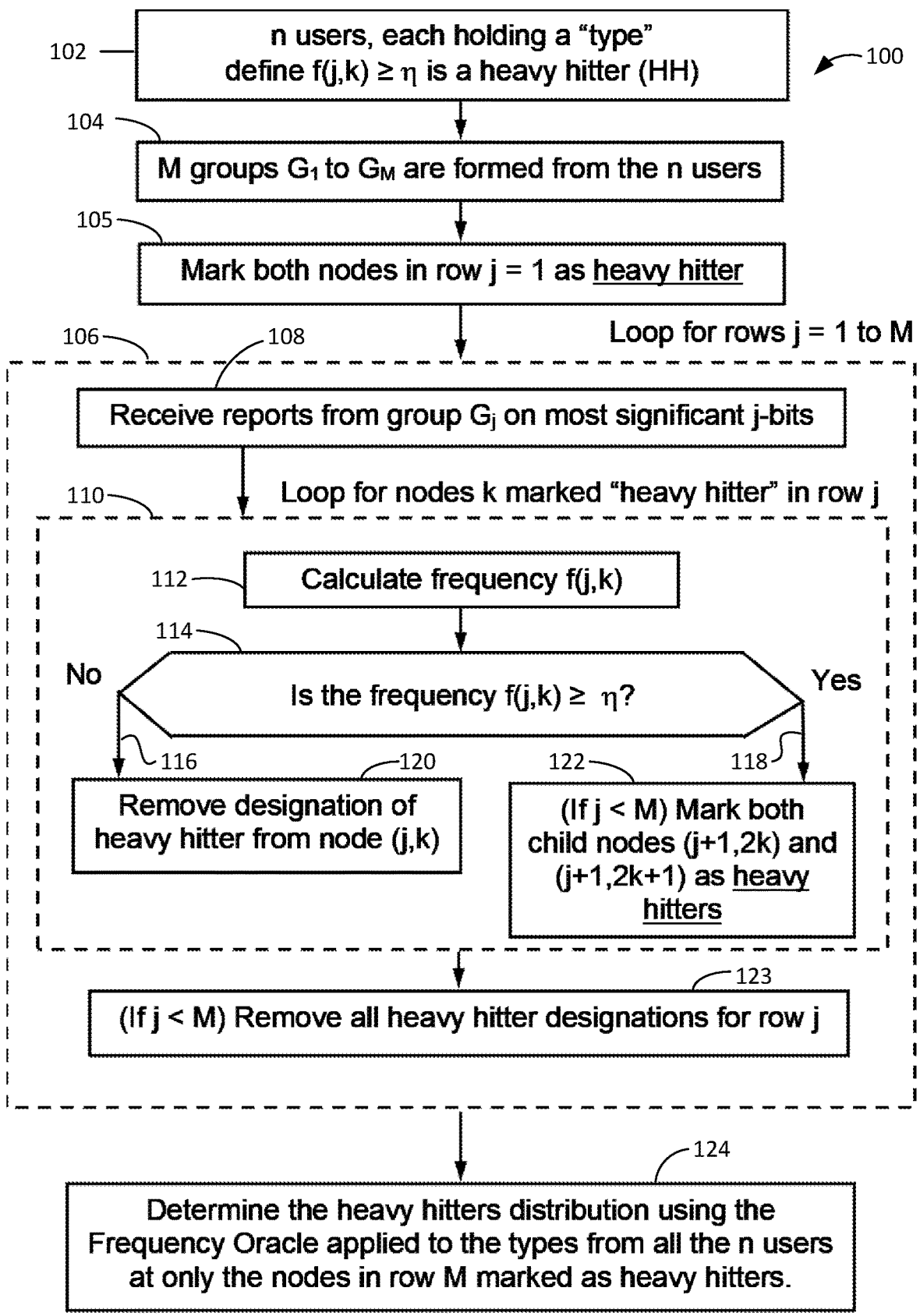
FIG. 1 is a first flowchart for a tree-based aggregation heavy hitters algorithm.

Flowchart for an Embodiment of the Tree-Based Aggregation Heavy Hitters Algorithm FIG. 1 is a flowchart 100 corresponding to an embodiment of the TreeHist algorithm with minimal storage of data relating to the heavy hitter status of nodes. Flowchart 200 in FIG. 2 corresponds to another embodiment of the TreeHist algorithm. The TreeHist protocol begins a first phase ("pruning the tree") in block 102 with a large group of n users i, each holding a "type", designated $x_i$. A set of M groups is formed in block 104 by dividing up the n users into groups $G_1$ to $G_M$. To assist in preserving user privacy during the calculation of the heavy hitters histogram, only one of these groups (specifically, group $G_j$) will be interrogated by the frequency oracle for each row j of the binary prefix tree 300 in FIGS. 3-6. The top node 302 in the tree represents the entire set of types and therefore node 302 may typically always be a heavy hitter. All other nodes below node 302, such as nodes 304, 306, . . . may be heavy hitters or not. In block 105, both nodes in row j=1 are marked as heavy hitters—these designations for the moment only represent the fact that these two nodes may possibly be heavy hitters (this marking is needed for proper functioning of loop 110 when j=1, the first cycle of loop 106). In some embodiments, loop 106 begins with j=1, corresponding to the second row (containing the two nodes 304 and 306). In some embodiments, loop 106 may begin with j=0, corresponding to the top row (containing only node 302).

Loop 106 executes sequentially for each row j=1 to M of the tree 300. Block 108 brings in reports from group $G_j$ (after they have received a request for this data from the server). Loop 110 then executes for all the nodes k in row j which have been marked as heavy hitters in the previous cycle of loop 106 by block 122. Note that if the calculation in block 112 discovers that the block is not a heavy hitter, this marking will be removed in block 120. Block 112 compares the calculated frequency f(j,k) to the heavy hitter criterion η—if f(j,k)<η, then node (j,k) has turned out to be a non-heavy hitter. This node was only thought to possibly be a heavy hitter (in block 122) because its parent node in the previous cycle of loop 106 had been determined to be a heavy hitter. In this case, it is possible that both, or only one, or none of the two child nodes will be heavy hitters. For example, if f(j,k) is 1.2 η, then it is possible that the two child nodes down one row from node (j,k) could both have f(j+1,2k)~0.6η and f(j+1,2k+1)=1.2η−f(j+1,2k)~0.6η and thus neither child node of this particular heavy hitter node ends up being classified as a heavy hitter—a somewhat counterintuitive result.

In decision block 114, the calculated frequency f(j,k) from block 112 for node (j,k) is compared with the pre-defined minimum count required for a node to be considered a heavy hitter. In some embodiments, $\eta \sim \sqrt{n}$ based on considerations of error rates—larger values of η may lead to excessive error rates while smaller values of η may miss some heavy hitters.

If the frequency f(j,k) is below the heavy-hitter criterion η then branch 116 is followed to block 120, where the heavy hitter designation for node (j,k) is pruned from the tree. Some embodiments may employ data storage arrays containing the (j,k) locations of all non-heavy hitters. Some embodiments may employ data storage arrays containing the (j,k) locations of heavy hitter nodes. Some embodiments may employ arrays generally conforming to the bit prefix tree and having bits which may be set to a "1" or "0" to indicate that a node is a non-heavy hitter, and conversely the bit may be set to a "0" or a "1" to indicate that a node is a heavy hitter. Other methods for storing information about the locations of non-heavy hitter nodes and/or heavy hitter nodes fall within the scope of the disclosure. Some embodiments may start with no pre-defined nodes (or node addresses) and then construct on a row-by-row basis a tree comprising only the heavy hitter nodes. For example, in some implementations only the list of heavy nodes are maintained for a given row, and once the next row is processed then the previous (parent) node can be deleted (e.g., to free up memory). Some embodiments may start with an entire pre-defined tree, wherein during algorithm execution nodes and branches are successively pruned.

If the frequency f(j,k) is equal to or above the heavy-hitter criterion η then branch 118 is followed to block 122 where the two child nodes (j+1, 2k) and (j+1, 2k+2) of parent node (j,k) are marked as a heavy hitters—note that these designations may be removed in block 120 during the next cycle of loop 106.

Block 123 removes all the heavy hitter designations for row j at the completion of each cycle of loop 106 unless j=M (the final cycle of loop 106). This operation is performed because once all the child nodes below every heavy hitter node in row j have been designated as potential heavy hitters, there is no longer any need to store the status of nodes in row j.

After completion of all cycles for loop 110, loop 106 steps to the next row j. Upon completion of all M cycles of loop 106, block 124 is entered where a final estimation (phase 2) is performed in which the frequency oracle is called for a last time but now with data from all n users but only determining frequencies f(M,k) at nodes whose heavy hitter/non-heavy hitter status was finalized during the last two cycles (j=M−1 and M) of loop 106. No nodes in row M are designated as heavy hitters during the final cycle (j=M) of loop 106. Some nodes may have their designation as a heavy hitter removed during the final cycle of loop 106. The last cycle of loop 106 which can mark a node as a heavy hitter is j=M−1.

Note that the "default" status in FIG. 1 for all nodes is "non-heavy hitter". Because this is the default status, there is no need to store a "non-heavy hitter" marking for any nodes. As the algorithm executes row-by-row, a small number of nodes (relative to the total number of nodes) will be marked as "heavy hitters". These initial designations in block 122 actually signify a possibility that these nodes are heavy hitters, however until their respective frequencies are calculated in block 112 during the next cycle of loop 106, these initial designations are conditional. For coding considerations, it may be more efficient to store the (j,k) addresses of heavy hitter nodes.

While the description of FIG. 1 above, and FIG. 2 below, describes "marking" nodes (e.g., as heavy hitters and/or non-heavy hitters), this term is used to signify that nodes can be identified as heavy hitters. For example, the tree may contain only nodes that are heavy hitters (e.g., with non-heavy hitter nodes not having been created), which can be considered as "marking" (e.g., nodes that are present are heavy hitters or potential heavy hitters, and nodes that are not present are non-heavy hitters) In other words, the marking can be implicit and/or explicit.

Determination of Heavy Hitters Using Tree-Based Aggregation (TreeHist Protocol)

Figure 2:
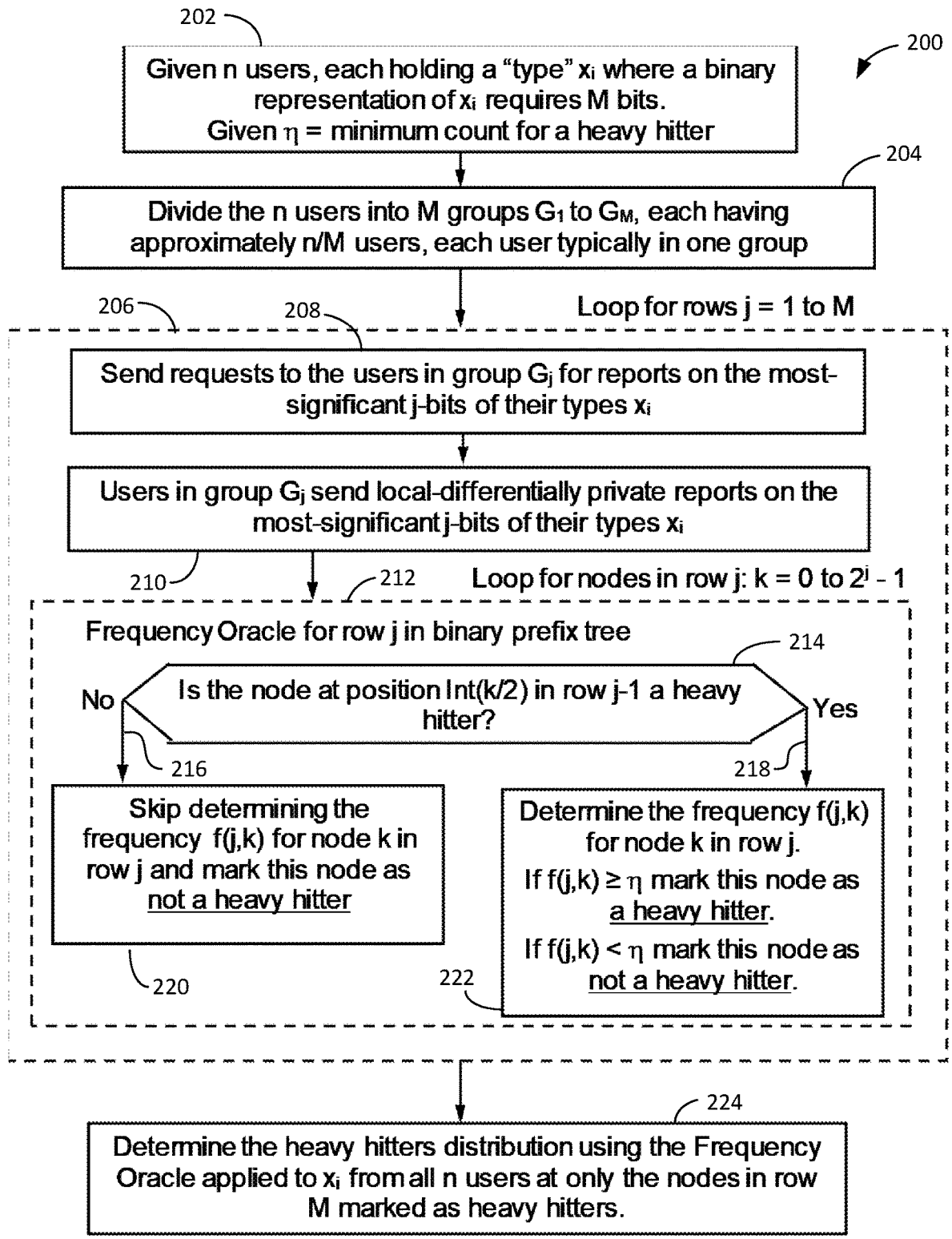
FIG. 2 is a second flowchart for a tree-based aggregation heavy hitters algorithm.

FIG. 2 is a flowchart 200 of another embodiment of the heavy hitters algorithm ("TreeHist") using tree-based aggregation, and FIGS. 3-6 illustrate various steps during the execution of the TreeHist algorithm. The TreeHist protocol begins in block 202 where a typically very large group of n users (often comprising multiple-millions of users of some internet application, such as e-mail, music file serving, a web browser, etc.) may each hold a "type", designated $x_i$, which is an element of a known set, X, such as a set of emoji's available from an e-mail service, or all the music selections accessible from a music file-sharing service, or URLs accessed by a browser, etc. We assume that there is some integer, M, large enough such that all the types $x_i$ may be represented by a unique binary number having M-bits (i.e., the set X would comprise $\leq 2^M$ integers ranging in value from 0 to $2^M-1$). In addition, we also assume that a value, η, is given for the minimum frequency (i.e., number of occurrences of a type) required for an element x, to be considered a heavy hitter. In FIGS. 3-6, set X is represented by a triangle 302, which is the top of a binary prefix tree 300 extending downwards from triangle 302. Binary prefix tree 300 is a particular form of M-level binary tree comprising nodes representing j-bit prefixes, i.e., the first, most-significant, j-bits out of the M-bits in the representations of each $x_i$. Thus, node 304 corresponds to all types $x_i$ in X having "0" as their first bit. Similarly, node 306 corresponds to all types $x_i$ in X having "1" as their first bit. Taken together, nodes 304 and 306 contain all possible types $x_i$ in set X, divided into two subgroups which may both typically be very large. Similarly, nodes 308-314 correspond to 2-bit prefixes, 00, 01, 10, and 11, respectively.

Figure 3:
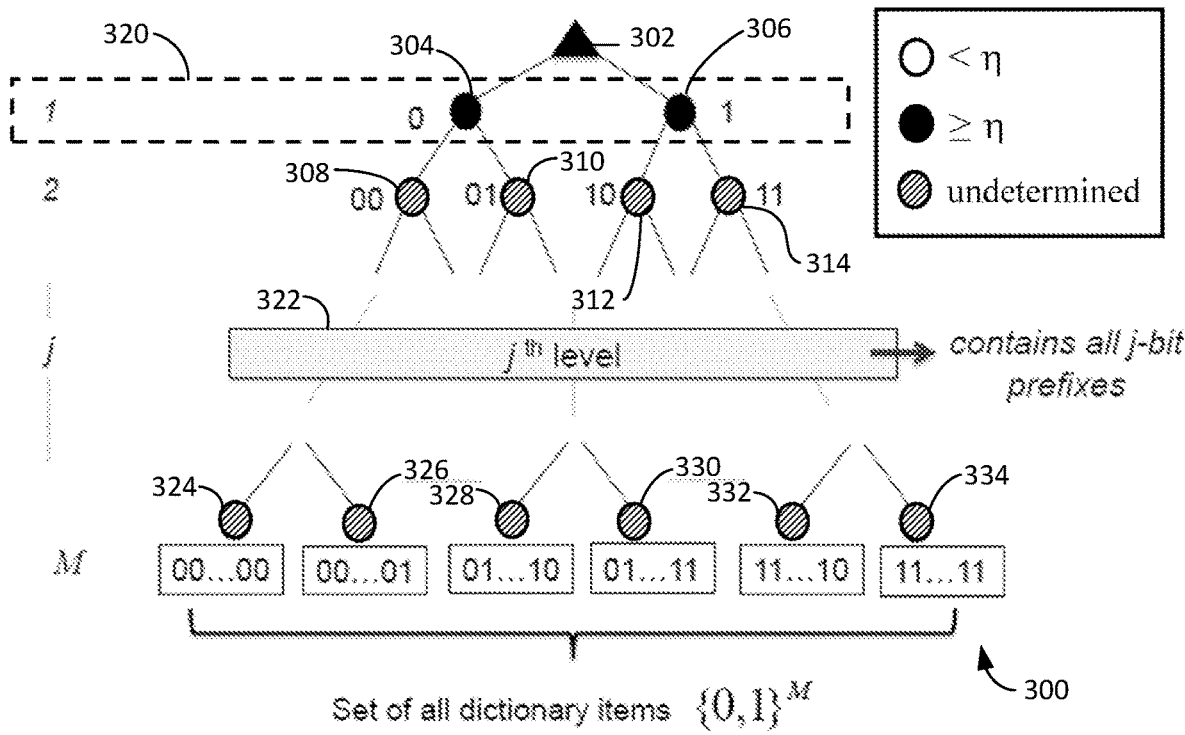
FIG. 3 is a binary prefix tree illustrating a first step in a heavy hitters algorithm.

FIG. 3 illustrates a situation after execution of block 208 and then block 210 for the first row j=1 of the binary prefix tree 300. We denote in FIG. 2 the frequency of node 304 to be f(1,0) [row 1, column 0] and the frequency of node 306 to be f(1,1) [row 1, column 1]. The binary prefix tree comprises M rows, numbered j=1 to M, each row comprising $2^j$ nodes numbered from 0 to $2^j-1$. Thus, row j=1 has two nodes, row j=2 has four nodes, etc., up to the bottom row, j=M, having $2^M$ nodes, numbered from 0 to $2^M-1$. In general, the great majority of nodes, especially in the lower rows (j near M) of binary prefix tree 300, will not be heavy hitters. The improved efficiency of the TreeHist algorithm for determining the heavy hitters arises from the elimination of most nodes from the calculation of frequencies at each row performed by the frequency oracle, as will be described below with reference to FIGS. 2-6.

To further enhance the protection of user privacy during the execution of this tree-based aggregation algorithm, the population of n users (where n may range into the millions), is subdivided in block 204 into M subgroups, $G_1$ to $G_M$, wherein each subgroup may contain approximately n/M members (i.e., $G_1$ to $G_M$ are roughly equal in size). Each user may be allocated to exactly a single group, although this may not be a requirement for any heavy hitter algorithm to adequately preserve user privacy. By using data from different users in the calls to the frequency oracle for each row (i.e., rectangle 302 in FIG. 3, rectangle 420 in FIG. 4, and rectangle 520 in FIG. 5) user privacy protection is further enhanced.

In some embodiments, instead of a division of users into groups $G_1$ to $G_M$ by the server, a process may be employed in which individual users themselves randomly select which prefix to sample (i.e., 1-bit, or 2-bit, . . . , or M-bit) and then send this data to the server where a locally differential private count sketch protocol accumulates user data to generate the node frequencies. An assumption of a very large number of users n ensures that the individual groups, although based on random selections by the users in these embodiments, will typically comprise similar numbers of users, as in FIG. 2.

Loop 206 executes sequentially for M different values of an index, j, where j=1, then j=2, . . . , and finally j=M, during a first phase of the algorithm called "pruning", in which nodes not corresponding to heavy hitters are pruned from the "tree" as soon as it is clear that they are not heavy hitters. The basis for the efficiency of the tree-based aggregation algorithm is the observation that in a binary prefix tree 300, if any node (j,k) [row j, column k] has a frequency $f(j,k) > \eta$, then all nodes upwardly-connected to node (j,k) [i.e., all nodes (j',k) where j'<j] necessarily will also have frequencies>$\eta$. Conversely, if a given node (j,k) has a frequency $f(j,k) < \eta$, then all nodes downwardly-connected to node (j,k) [i.e., all nodes (j",k) where j">j] necessarily will also have frequencies<$\eta$. To see why this is true, look upwards in binary prefix tree 300 (e.g., from nodes 312 (2,2) and 314 (2,3) to node 306 (1,1) in FIG. 3—since by definition, all frequencies are $\geq 0$ (since the frequency is a count, and a count cannot be <0), the frequency of node 306 f(1,1) must satisfy the relationship: $f(1,1)=f(2,2)+f(2,3)$, and thus $f(1,1) \geq f(2,2)$ and $f(1,1) \geq f(2,3)$. Furthermore, the equality relationship can only hold if at least one of these conditions holds: $f(2,2)=0$ or $f(2,3)=0$.

FIG. 3 illustrates a first cycle of loop 206 acting on the binary prefix tree 300 where j=1. Dashed rectangle 320 represents the use of a frequency oracle (such as block 212) as applied to the 1-bit prefixes 304 (first bit "0") and 306 (first bit "1"). In block 208, the server requests all users in group $G_1$ to send reports to the server on the most significant 1-bit (MSB) of their respective types $x_i$. In block 210, the users then send their reports to a local differentially private count sketch protocol executing in the server. At this stage in the protocol execution, the frequencies f(1,0) and f(1,1) [nodes 304 and 306, respectively] have been determined by the frequency oracle—both node frequencies are shown in FIG. 3 to be $\geq \eta$ with black solid fill. Frequencies for nodes 308-314 and nodes 324-334 have not been determined (i.e., frequency oracles 420 and 520 have not executed yet)—thus these nodes are shown with shading, representing undetermined frequency values. Between rows 2 and M, row j 322 contains all j-bit prefixes (first j-bits of all binary representations of $x_i$ values in X). In flowchart 200, rectangle 320 represents the execution of blocks 214-222 within block 212. For row 1, Int (k/2) [i.e., an integer which is k/2 rounded down to the next integer below—in this case, k=1, so k/2=0.5 which rounds down to 0] represents node 302 at location (0,0). The decision block 214 corresponds to finding the node in row j−1 which is downwardly connected to nodes k and k+1 in row j—e.g., node 304 (prefix=0) in row 1 connects downwardly to node 308 (prefix=00) and node 310 (prefix=01) in row 2. Node 306 (prefix=1) in row 1 connects downwardly to node 312 (prefix=10) and node 314 (prefix=11). As the frequency oracle runs for both nodes in row 1, in this example, block 220 is not entered because node 302 (in row j=0) must be a heavy hitter since it contains all the elements of set X), and block 222 is used to determine the frequencies for node 304 [k=0 and $f(1,0) \geq \eta$] and node 306 [k=1 and $f(1,1) \geq \eta$]. At this point, the first cycle through loop 206 (for j=1) is complete.

Figure 4:
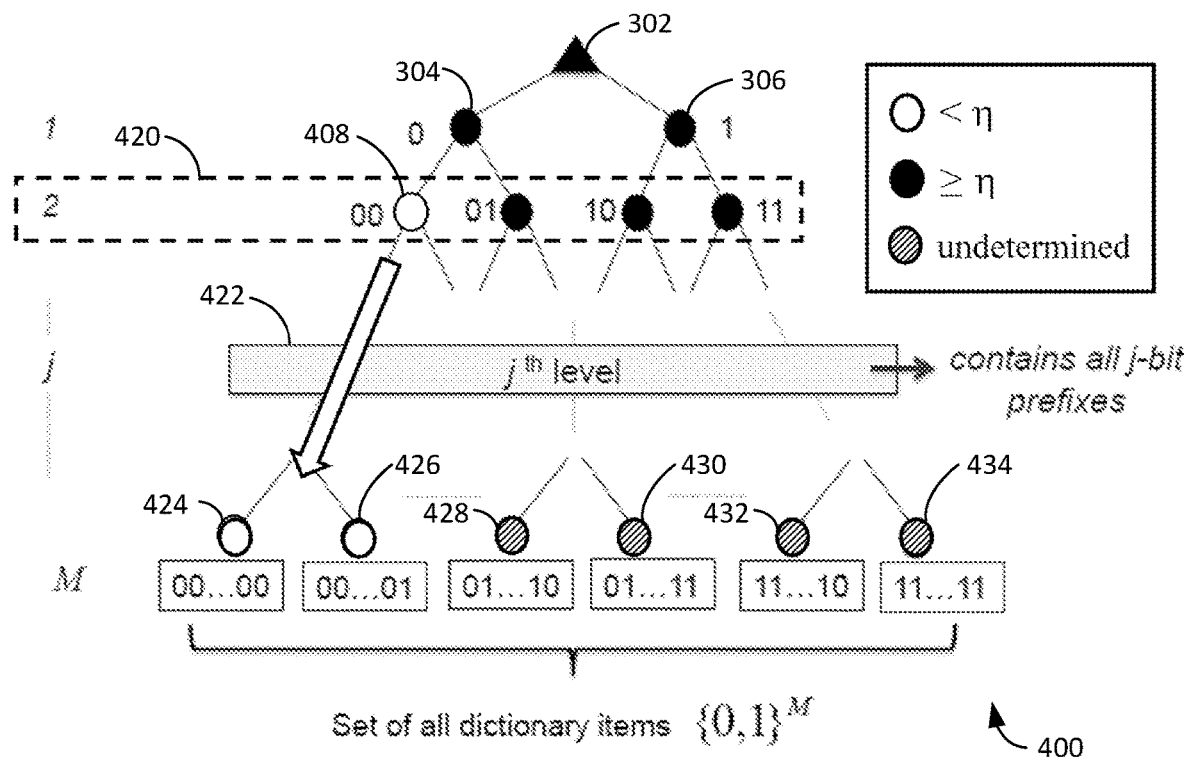
FIG. 4 is a binary prefix tree illustrating a second step in a heavy hitters algorithm.

FIG. 4 illustrates a second cycle of loop 206 acting on the binary prefix tree 300, where now j=2. Requests are sent to the users in group $G_2$ from block 208 for reports on the most significant 2-bits of their types $x_i$. As for FIG. 3, users respond in block 210 to this request, sending local differentially private reports to the server. The frequency oracle (block 212) now executes. Since both nodes 304 and 306 had frequencies>$\eta$, decision block 214 does not follow "No" branch 216 to block 220, but instead follows "Yes" branch 218 to block 222 [where f(j,k) is determined]. If $f(j,k) \geq \eta$, then node 408 (00) is marked as a heavy hitter, while if $f(j,k) < \eta$, then node 408 (00) is marked as not a heavy hitter. "Marking" a node may correspond to setting a bit (flag) in an array (see below) having an array element corresponding to each node in the row. Other types of "marking" can also be used (e.g., nodes that are present after pruning can be determined to be heavy hitters). Each successive row (i.e., increasing value of j) will required twice as many array elements as were required for the neighboring row directly above (i.e., j−1). The final row, M, will require M array elements. The following two array configurations for recording the Yes/No heavy hitter status of nodes are possible, and other array configurations also fall within the scope of the technology:

1) An array $D_1$ may be used to store the node numbers for all the heavy hitters in a single row. This number of array elements may correspond to a large array and is based on the expectation that the value of $\eta$ has been chosen to restrict the number of heavy hitters to no more than the order of $\sqrt{n}$. Array $D_1$ would provide information about the nodes in row j−1 for use in block 214. A second array $D_2$ may be used to store the results for the nodes in row j from block 220 or block 222. At the end of execution of block 212 for each value of j, then array $D_1 \leftarrow$ array $D_2$ and the contents of array $D_2$ could then be erased.

2) A two-dimensional array D may be used to store the node numbers for the heavy hitters in all rows of the binary prefix tree 300—this array in principle would need to be about twice the size of either array $D_1$ or $D_2$. Block 214 could access previously-stored Yes/No data in the D(j,k) array for the nodes in row j−1 of the binary prefix tree 300. Blocks 220 and 222 would then save Yes/No data in D(j,k) for all the nodes in row j.

At the completion of the second cycle of loop 206 (illustrated by dashed rectangle 420), node 408 has been determined to be not a heavy hitter and thus is now shaded white, while the three nodes 410-414 are heavy hitters and thus are now shaded black. In some embodiments, as in the flowchart of FIG. 1, all nodes which are upwardly-connected to node 408 would be known to be not heavy hitters, however these nodes would only by marked as non-heavy hitters (and thus shaded white) when their respective rows are subsequently processed in loop 212 of flowchart 200. In some embodiments, all the nodes upwardly-connected to non-heavy hitter node 308 would immediately be marked as not heavy hitters (and all shaded white). For example, in FIG. 4, where node 408 (prefix=00) has been determined to be not a heavy hitter by the frequency oracle, then we know that in the next row down, the nodes with prefixes starting with "00" will all be non-heavy hitters. Examples include prefixes 000, and 001 in row 3, prefixes 0000, 0001, 0010, and 0011 in row 4, etc. Thus, all prefixes "00xxxxx . . . xxx" in row M (a total of $2^{M-2}$ nodes out of the total in row M of $2^M$—i.e., one fourth of the nodes in row M) will be non-heavy hitters just based on the single node 308 in row 2. In general, a non-heavy hitter node in row j will cause $2^{M-j}$ nodes in row M to be marked as non-heavy hitters—this is the basis for the speed improvements in determining the heavy hitter distribution using the TreeHist algorithm.

Figure 5:
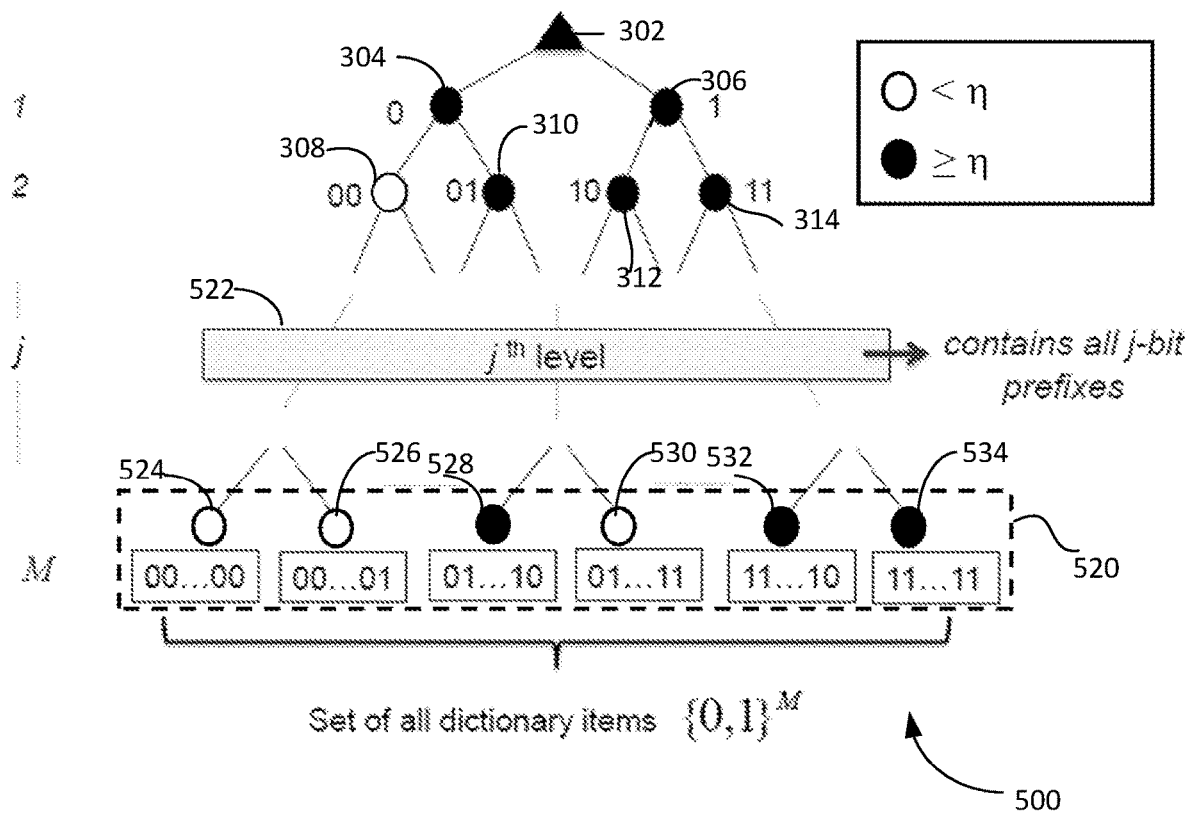
FIG. 5 is a binary prefix tree illustrating a later step in a heavy hitters algorithm.

FIG. 5 is a binary prefix tree 300 illustrating the results of a last step (represented by dashed rectangle 520) of the "pruning" phase of the tree-aggregation algorithm (TreeHist). Nodes 524, 526, and 530 have been determined to be non-heavy hitters (and thus are shaded white), while nodes 528, 532, and 534 have been determined to be heavy hitters (and thus are shaded black). The population of users in group $G_M$ are the only users contributing to the frequencies calculated for nodes 528, 532 and 534 by the frequency oracle. Thus, the ratios of the counts in these three nodes may be roughly the same as they would be if the entire population of n users had been used (instead of the small subset of X in group $G_M$ having approximately n/M members), however the levels of noise may be higher—this is the basis for the final estimation phase illustrated in FIG. 6.

Figure 6:
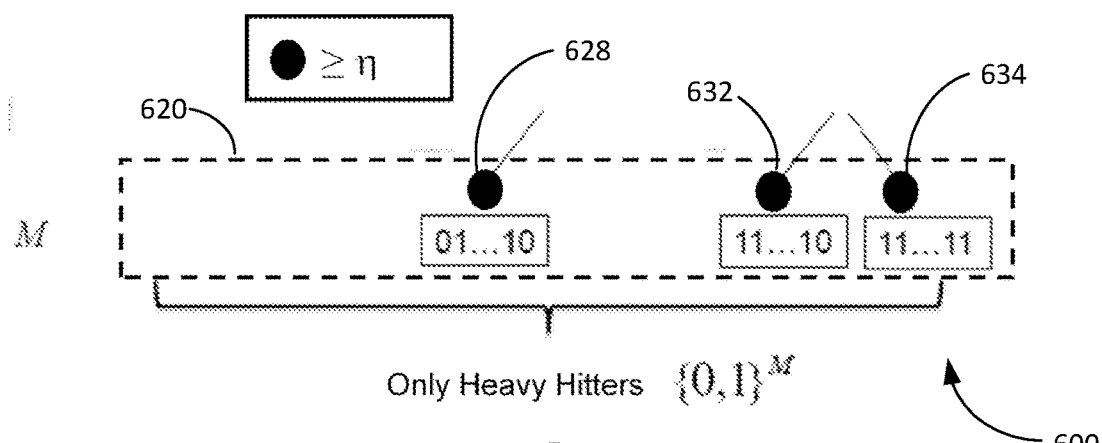
FIG. 6 is a binary prefix tree illustrating a final step in a heavy hitters algorithm.

FIG. 6 illustrates the second phase (final estimation) of the tree-aggregation algorithm TreeHist: block 224 where frequency oracle (represented by dashed rectangle 620) executes for all n users only on the nodes which have been determined in the last step of the pruning phase to be heavy hitters—in this example, nodes 628, 632, and 634, corresponding to nodes 528, 532, and 534, respectively in FIG. 5. It is anticipated that the great majority of the original set of $2^M$ nodes in row M will be non-heavy hitters. For embodiments using the two-dimensional array D, these nodes would already have been marked as non-heavy hitters (and thus shaded white). For embodiments using the arrays $D_1$ and $D_2$ (according to flowchart 200), these nodes would be marked as non-heavy hitters during the execution of loop 206 for j=M from a "No" decision in block 214 through branch 216 to block 220. Since all n users are involved in this second phase, more accurate (less noisy) estimates may be obtained for the individual heavy hitter frequencies.

The following section describes the operation of the frequency oracle, and in particular how computation times to determine the heavy hitters distribution (in row M) may be substantially reduced by submitting only nodes to the frequency oracle which are not known to be non-heavy hitters at each row j (1≤j≤M). Note that many of these nodes may subsequently turn out also to be non-heavy hitters. The only way a specific node (e.g., in row j) may already be known to be a non-heavy hitter is if one of its parent nodes (i.e., a node in a row<j which is downwardly connected to the specific node under consideration) has already been determined to be a non-heavy hitter.

Aspects of Embodiments

For both FIGS. 1 and 2, various embodiments fall within the scope of the technology. In both FIGS. 1 and 2, the actual heavy hitters distribution is determined in the second phase, blocks 124 or 224. The only inputs to this second phase from the first stage ("pruning") are the markings of nodes in row M to be Yes/No (i.e., only one bit of information) relative to being heavy hitters. Due to the potentially enormous numbers of nodes (e.g., if M=32, there will be $2^{33}-1=8,589,934,591$ nodes) and the fact that the vast majority of these nodes will be non-heavy hitters, coding of the TreeHist algorithm may employ various well-known methods for dealing with sparsely filled arrays (assuming that the status of "non-heavy hitter" is the default status and it is only necessary to store the node numbers (j,k) for the relatively small fraction of node numbers corresponding to heavy hitters).

A Frequency Oracle for Use in Determining the Heavy Hitters

Figure 7:
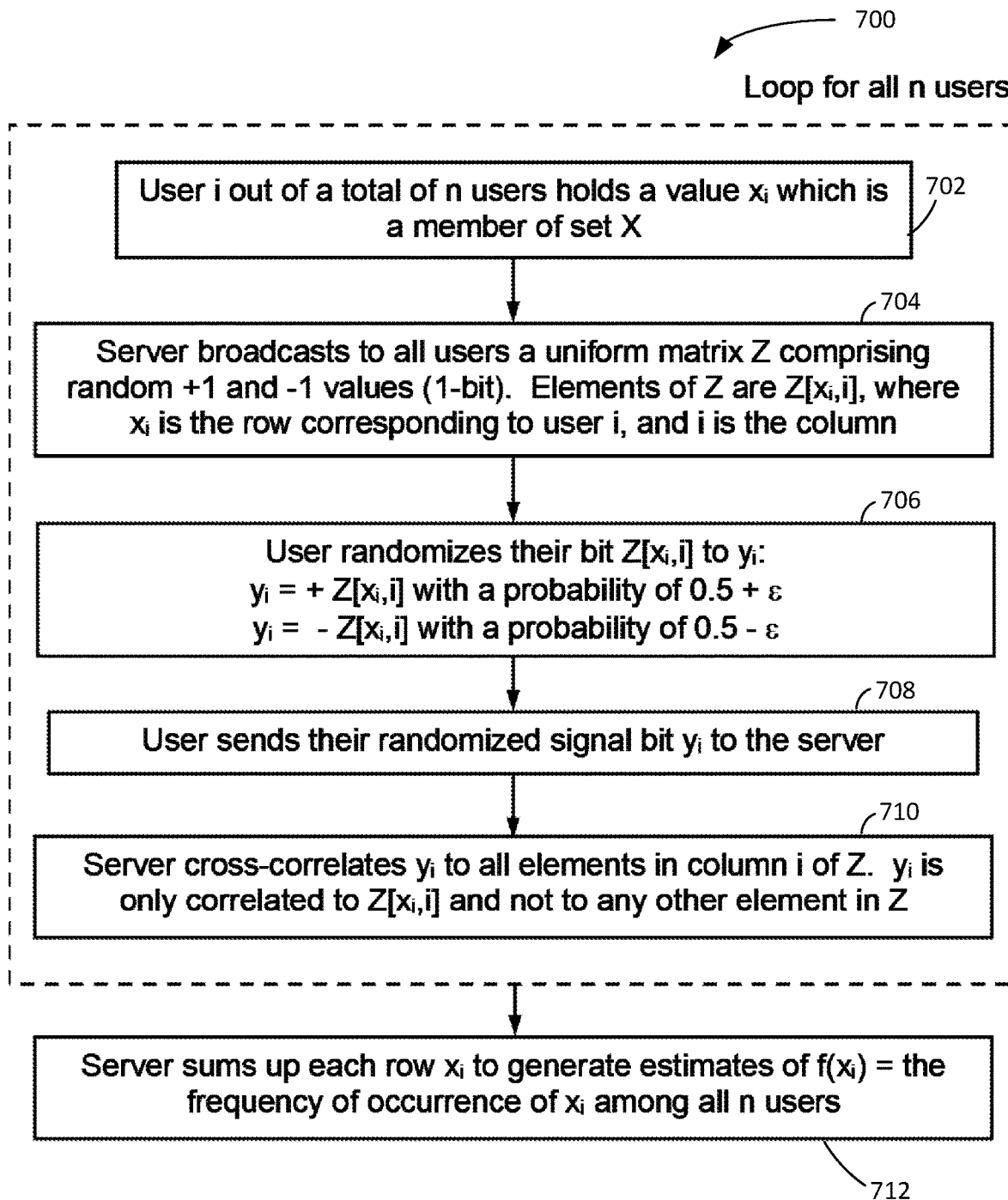
FIG. 7 is a flow chart of a heavy hitters algorithm based on bit-wise reconstruction.
Figure 8:
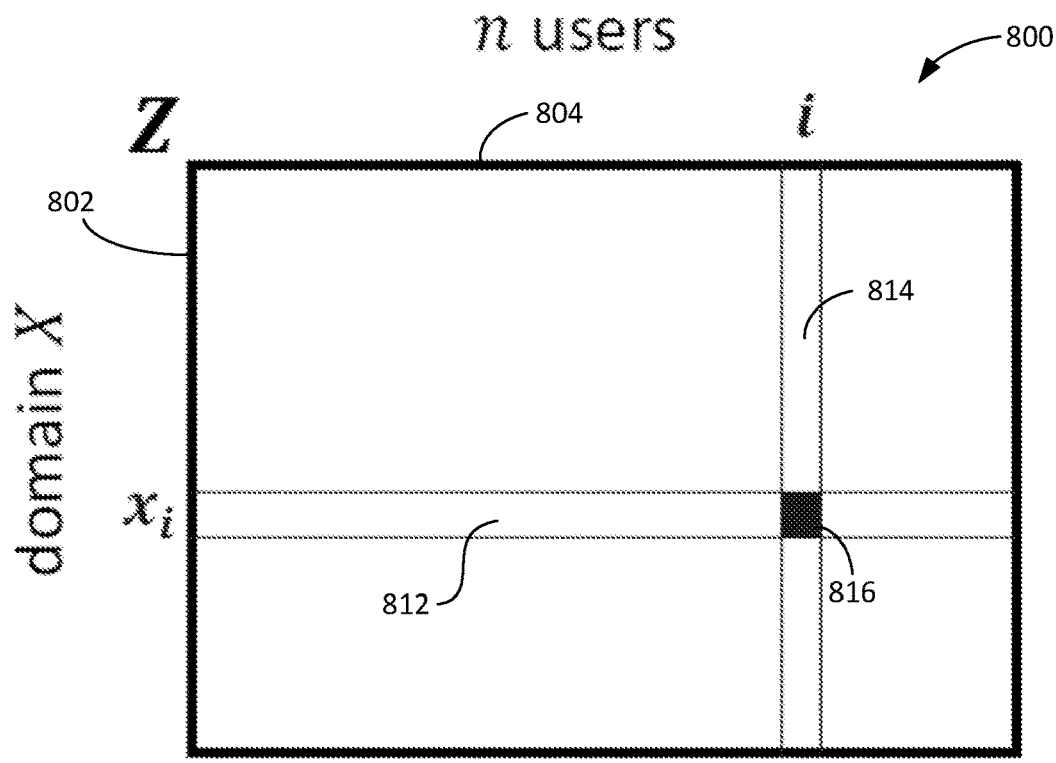
FIG. 8 is a diagram of a matrix Z with inputs from user i.
Figure 12:
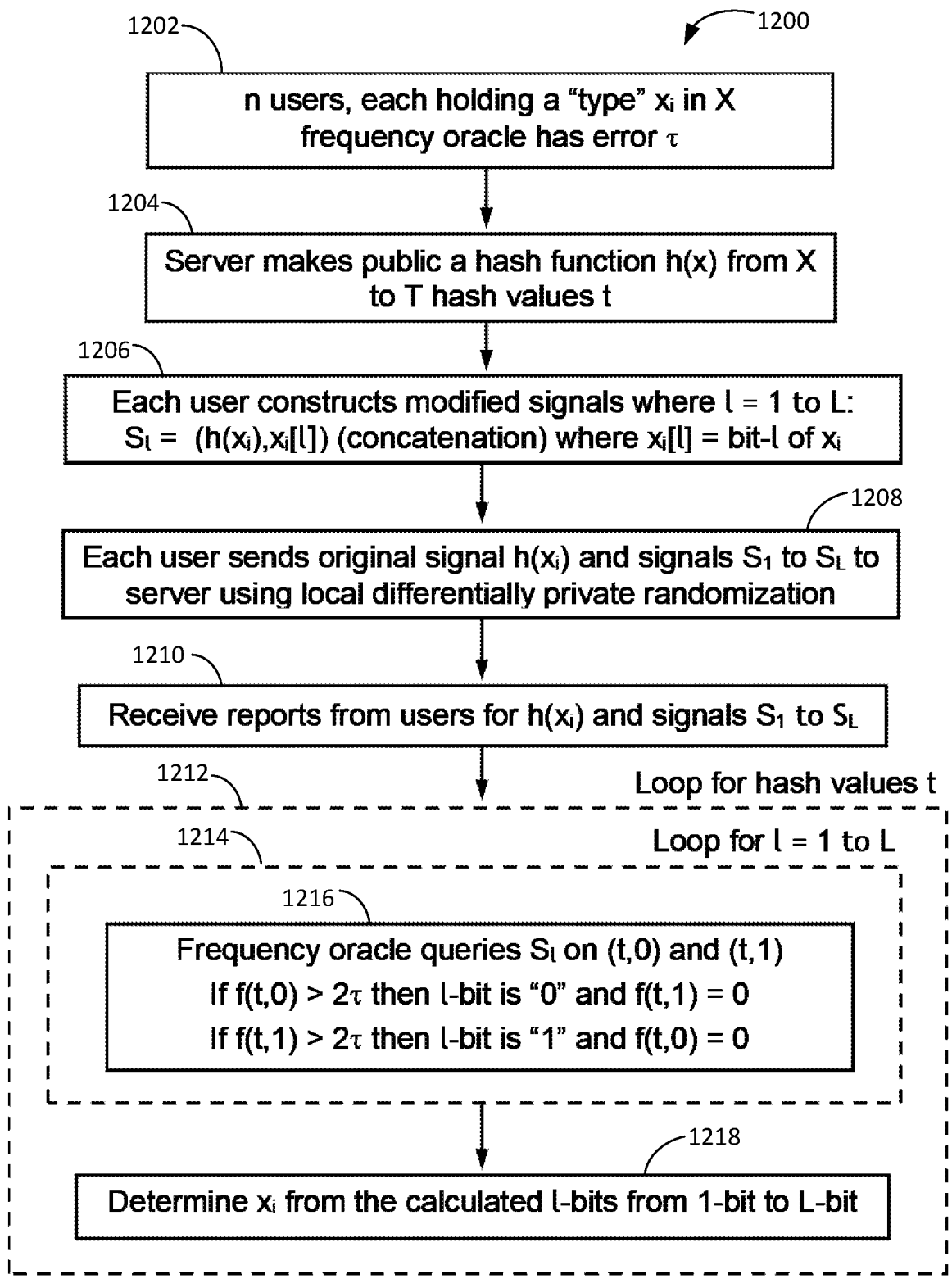
FIG. 12 is a flowchart for a bit-wise heavy hitters algorithm.

In this section, with reference to FIGS. 7 and 8, we discuss the operation of a frequency oracle as might be employed in both the tree-based aggregation algorithm in FIGS. 1-6 ("TreeHist") as well as the bit-based algorithm in FIG. 12. In block 702, a user is assumed to hold a value $x_i$ which is an element in set X. Element $x_i$ may represent an emoji which was included in an e-mail sent by the user, or x, may represent a particular piece of music downloaded from a music file-sharing site, etc. The internet company operating the server would like to collect statistical usage data for the elements $x_i$ in set X, while the users would like to prevent the internet company from collecting user-specific data. To accomplish these two goals simultaneously as discussed above for the TreeHist algorithm, a randomization process is employed in the frequency oracle. In block 704, the server generates and then broadcasts to all users a uniform matrix Z with a number of rows corresponding to the total number of elements $x_i$ in set X, and a number of columns corresponding to the number of users n.

In block 706, the user randomizes their bit $Z[x_i,i]$ from matrix Z with a slightly positive correlation between the user signal $y_i$ and bit $Z[x_i,i]$—this slight positive correlation essentially "encodes" the coordinates $(x_i,i)$ into the user signal $y_i$, which is sent to the server in block 708.

FIG. 8 illustrates the cross-correlation operation performed in block 710 to "decode" coordinates $(x_i,i)$ from $y_i$. At the server, the received bit $Z[x_i,i]$ is cross-correlated to column I (the server knows which column in Z corresponds to user I, although even if $y_i$ were to be cross-correlated to every element in Z, there would only be a non-zero correlation at coordinate $(x_i,i)$. Since the signal $y_i$ sent by the user to the server has a small probability ε greater than random (where random corresponds to 0.5 probability) of correlating to bit $Z[x_i,i]$, multiplying bit $Z[x_i,i]$ by the bit at location $(x_i,i)$ 816 in matrix Z, will have a slightly higher probability of producing a "1" than of producing a "−1":

If bit $Z[x_i,i]$ is +1, then:
  $y_i$=+1 with a probability of 0.5+ε, therefore
    $Z[x_i,i] \cdot y_i = (+1) \cdot (+1) = (+1)$ has a probability of 0.5+ε
  $y_i$=−1 with a probability of 0.5−ε, therefore
    $Z[x_i,i] \cdot y_i = (+1) \cdot (-1) = (-1)$ has a probability of 0.5−ε

If bit $Z[x_i,i]$ is −1, then:
  $y_i$=+1 with a probability of 0.5−ε, therefore
    $Z[x_i,i]\cdot y_i$=(−1)·(+1)=(−1) has a probability of 0.5−ε
  $y_i$=−1 with a probability of 0.5+ε, therefore
    $Z[x_i,i]\cdot y_i$=(−1)·(−1)=(+1) has a probability of 0.5+ε
  Combining these four results gives:
  A (+1) result has a probability of 0.5+ε
  A (−1) result has a probability of 0.5−ε.

For all other elements in column i, since all the elements of matrix Z are uncorrelated with each other, then correlating signal $y_i$ with any other element $Z[x_i',i']$, where $x_i'\ne x_i$ and/or i' ≠i, will (on average) produce a value of 0. The randomization of bit $Z[x_i,i]$ to form $y_i$ may be viewed as "encoding" the location of cell $(x_i,i)$ into $y_i$ so that by cross-correlating $y_i$ with Z, cell $((x_i,i)$ may function as a "counter" which increments bit $Z[x_i,i]$ by +2ε on$_{average}$ for each $x_i$ sent to the server from a user.

In block 712, each row $x_i$ is summed up over all users (one per column) I, to generate an estimate of $f(x_i)$ after dividing by (2ε) since each cross-correlation has an average value of (2ε).

FIG. 8 shows matrix Z 800 with rows along axis 802 corresponding to various types $x_i$ and columns 804 corresponding to various users i out of a total number of users n. Column 814 corresponds to user i, and row 812 corresponds to type $x_i$. The user sends signal bit $y_i$ which is cross-correlated to all cells Z[x,i] since the server only knows what column bit $y_i$ corresponds to (the server knows each user's i value but does not know each user's $x_i$ value and thus the server must add $y_i$ to all the elements of column i in Z. As we saw in the calculations above, since $y_i$ only has a non-zero correlation with $Z[x_i,i]$ in column i, there will be no average contribution for any other row besides $x_i$.

Figure 9:
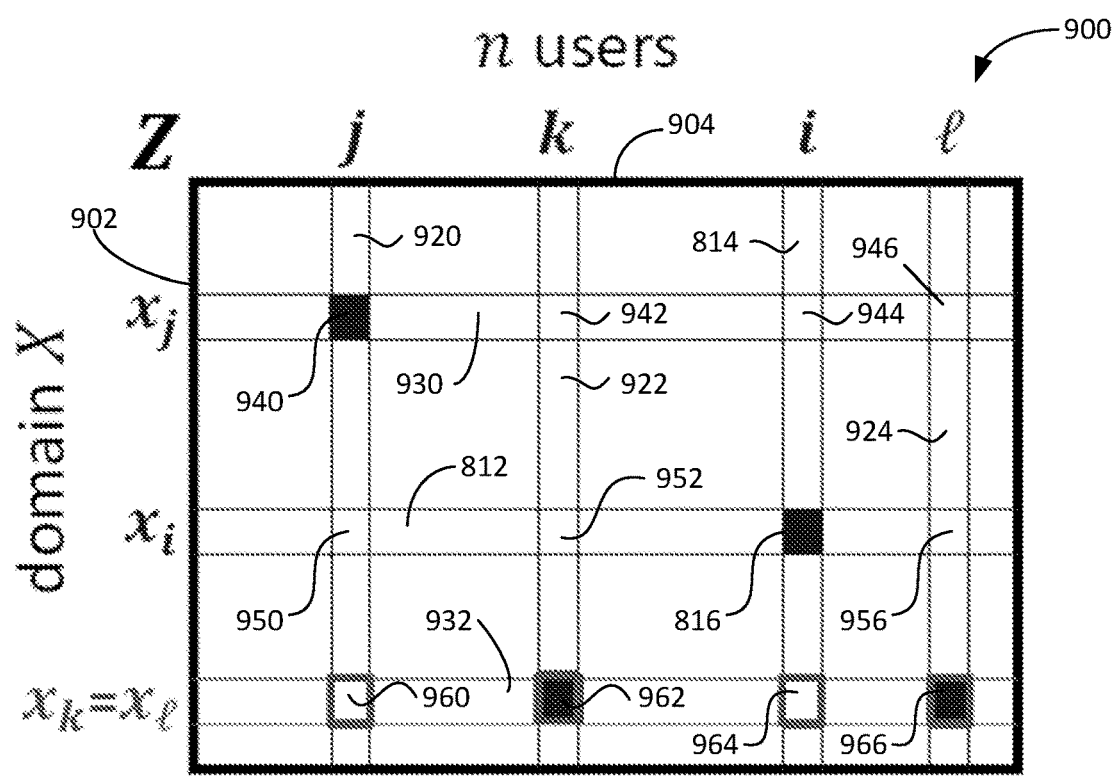
FIG. 9 is a diagram of the matrix Z with inputs from users i, j, k, and l.

FIG. 9 shows matrix Z 900 with contributions from user i (column 814) sending a signal bit $y_i$ as in FIG. 8, user j (column 920) sending a signal bit $y_j$, user k (column 922) sending a signal bit $y_k$, and user l (column 924) sending a signal bit $y_l$. As was the case in FIG. 8 for user I, the server knows which column each of users i, j, k, and l correspond to, but the server does not know which x values correspond to each user—thus for user j, the signal bit $y_j$ is added to all elements of Z in column j. Similarly, the signals for users k and l are added to all elements of their respective column. $Z[x_j,j]$ 940 is shaded dark because this element in Z has a positive correlation since row 930 corresponds to $x_j$. Other elements in row $x_j$ such as elements 942-946 have zero correlation and thus are not shaded. Users k and 1 are assumed to have the same type, $x_k$=$x_l$ thus row 932 has two dark shaded cells 962 and 966 corresponding to users k and l, respectively. Cells 960 and 964 are unshaded since they have zero correlations. Row $x_i$ 812 from FIG. 8 now has three cells 950-956 which are unshaded since they have zero correlations to users j, k, and l. Summing horizontally along rows $x_i$ and $x_j$ will indicate that one of the four users i to l had each of type $x_i$ and $x_j$. Summing horizontally along row $x_k$=$x_l$ will indicate that two users had type $x_k$=$x_l$. Note that although FIGS. 8 and 9 show cells shaded dark for non-zero correlations and unshaded for zero correlations, in reality when doing the cross-correlations the numbers in any cell of Z will be dominated by the noise added to the signals y. Only by adding along rows can the frequency estimates be obtained, not by examining individual elements in Z.

The frequency oracle algorithm may be seen to operate on each row $x_i$ of matrix Z separately—this aspect is taken advantage of in the tree-based aggregation algorithm "TreeHist" discussed in FIGS. 1-6, above. The frequency oracle is applied to each row of the binary prefix tree 300, but only to nodes which are not already known to be non-heavy hitters. In FIGS. 3-6, this corresponds to skipping over any row $x_i$ (for example with j-bits) where row $x_i$ is upwardly-connected to a parent node (a node having≤j−1 bits) which has already been characterized as a non-heavy hitter.

Actual and Estimated Frequency Distributions

Figure 10:
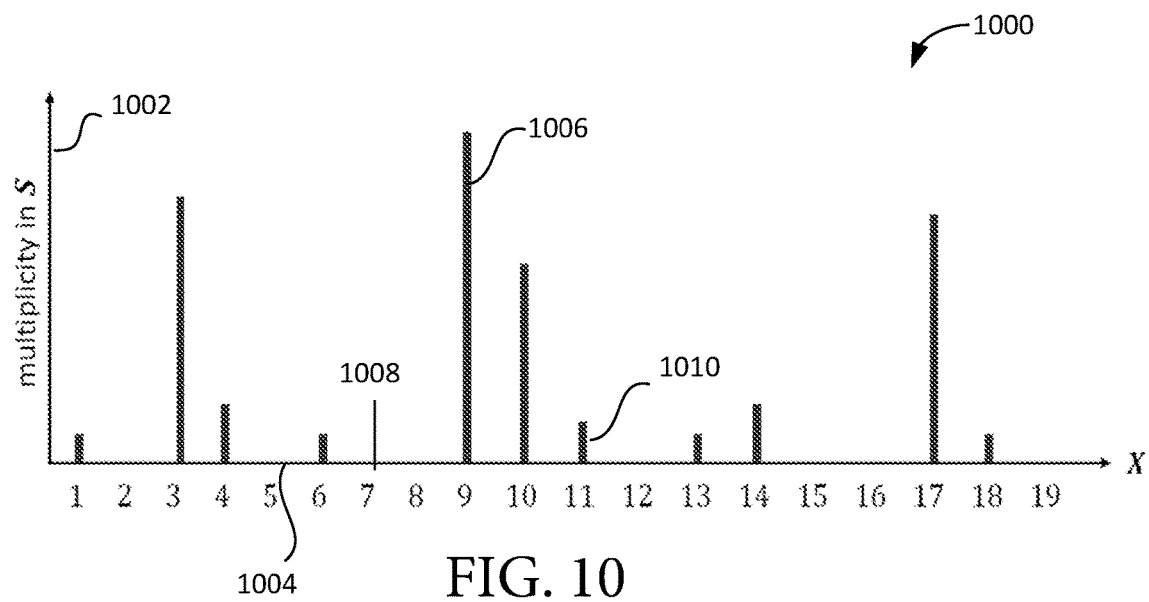
FIG. 10 is a graph showing true frequency values.

FIG. 10 shows a typical frequency distribution 1000 for nineteen different types (1 to 19 along axis 1004) with multiplicities along axis 1002. For example, type 9 has the highest frequency 1006 while other types, such as type 7 has a zero frequency 1008. Type 11 has a small frequency 1010 relative to type 9. The goal of the frequency oracle is to approximate these true frequencies f(1) to f(19) as closely as possible by averaging out the noise added to the signals $y_i$ from each user i.

Figure 11:
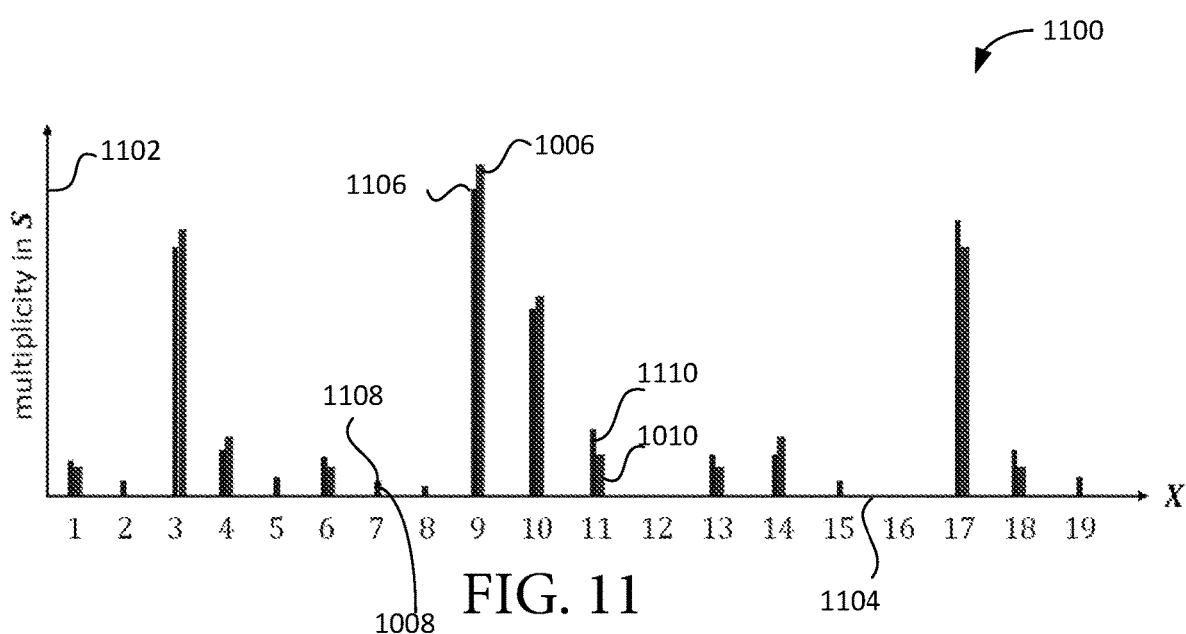
FIG. 11 is a graph showing true and estimated frequency values.

FIG. 11 shows both the true frequencies from FIG. 8 as well as estimates of these frequencies from a frequency oracle. Again, types 1 to 19 are shown along axis 1104 against a vertical frequency axis 1102. For type 9, the estimated frequency 1106 is only slightly less than the actual frequency 1006. For type 7, the actual frequency was zero, however the estimated frequency is slightly non-zero but still very close in value. For type 11, the estimated frequency 1110 exceeds the actual frequency 1010. If these demonstrated accuracies are inadequate, the accuracies of the estimated frequencies may be improved with larger numbers of users, or by averaging together multiple analyses.

Bit-Wise Algorithm for Determining Heavy Hitters ("Bitstogram")

FIG. 12 is a flowchart 1200 of a bit-wise algorithm for determining heavy hitters called "Bitstogram". Note that this algorithm treats the binary representations for the types x held by users in a bit-by-bit manner from the MSB to the LSB. This may be compared/contrasted with the TreeHist algorithm which treated the binary representations in a sequence of increasingly long prefixes. This algorithm is based on the same assumptions as "TreeHist" and uses a hash function to bring the number of elements (hash values) to be entered into the frequency oracle down to a reasonable number, which typically may be around In, although other numbers of hash values generated by the hash function fall within embodiments. In block 1202, we start with a similar type of user population as we did for flowcharts 100 and 200 for TreeHist. Recalling the assumptions at the beginning of this detailed description, n may be a very large number, in the millions. The size of set X may also be a very large number, and in some cases it may be a number which is very large even in comparison to n. This large size of X makes direct approaches to determining the frequency distribution, or the subset of the frequency distribution corresponding to heavy hitters, impractical due to time and resource constraints. The "Bitstogram" algorithm utilizes a hash function h to perform an initial search for heavy hitters x*, however these heavy hitters x* are grouped within a large number of other types held by users which are not heavy hitters, all of which may be mapped to a particular hash value. The task of the bit-wise protocol is to determine the actual heavy hitter x* out of this group of types x through a bit-by-bit reconstruction of the binary representation of the x* value.

In block 1204, the server makes public one or more hash functions h mapping from the set X onto a much smaller set with T hash values t. Thus, necessarily many elements in X will map into each hash value. However, because only a small fraction of the total number of elements in X are actually held by any of the n users, there may be a much smaller number (but still possibly still>>1) of types held by users which map to any one hash value. Now, since the number of heavy hitters within the group containing all the types held by the n users (even if held by only one user) is a small fraction of the total, we may choose the number of hash values to be approximately $\sqrt{n}$ (although other numbers fall within the scope of the embodiments), and we assume that in most cases, each hash value will have at most only a single heavy hitter x* mapping to it. Our task then, is to determine which type within the group represented by each hash value is the heavy hitter, among all the other types mapping to the same hash value which are not heavy hitters.

In block 1206, each user employs the hash function to map their $x_i$ value onto a particular hash value $h(x_i)=t$. Each user then creates L different signals $S_l$, where l=1 to L, and $S_1$,=$(h(x_i),x_i[l])$, where $x_i[l]$) is the l-th bit of $x_i$. This total of L concatenated pairs (i.e., all the bits of the hash value $h(x_i)$ with one bit added as the LSB which is taken from one position in $x_i$—this one-bit longer string essentially ties the hash value $h(x_i)$ to one of the L bits of $x_i$ but in a way which preserves user privacy with respect to the user's $x_i$ type. In some embodiments, all users contribute to the collection of data for all L bits in x. In some embodiments, data for each of the L bits in x may be determined from different subsets of the total number of users n. In some cases, these different subsets may be disjoint, so that no user ends up contributing to the collection of frequency data for more than one bit out of the L bits total—this way, any attempt to reconstruct a particular user's type $x_i$ would be impossible.

In block 1208, the user sends both the original hashed signal $h(x_i)$ as well as all L modified signals $S_1$ to $S_L$ to the server using local differentially private randomization to preserve privacy.

In block 1210, the server receives reports with the data transmitted by all n users in block 1208.

Block 1212 loops for all the hash values (T total) generated by the hash function and distributed publicly in block 1204.

Block 1214 is within loop 1212, and for each hash value t, loop 1214 cycles over the bit label l=1 to L.

In block 1216, the frequency oracle queries on the modified signal $S_l$ for the two possibilities for the l-bit: "0" and "1". Whichever frequency is >2τ indicates which l-bit value corresponds to the heavy hitter mapped to hash value t.

Finally, in block 1218, the complete heavy hitter type $x_i$ may be assembled from all the total of L bits determined in block 1216 during loop 1214.

Loop 1212 then cycles to the next hash value t to determine the next heavy hitter.

Computing Systems

Figure 13:
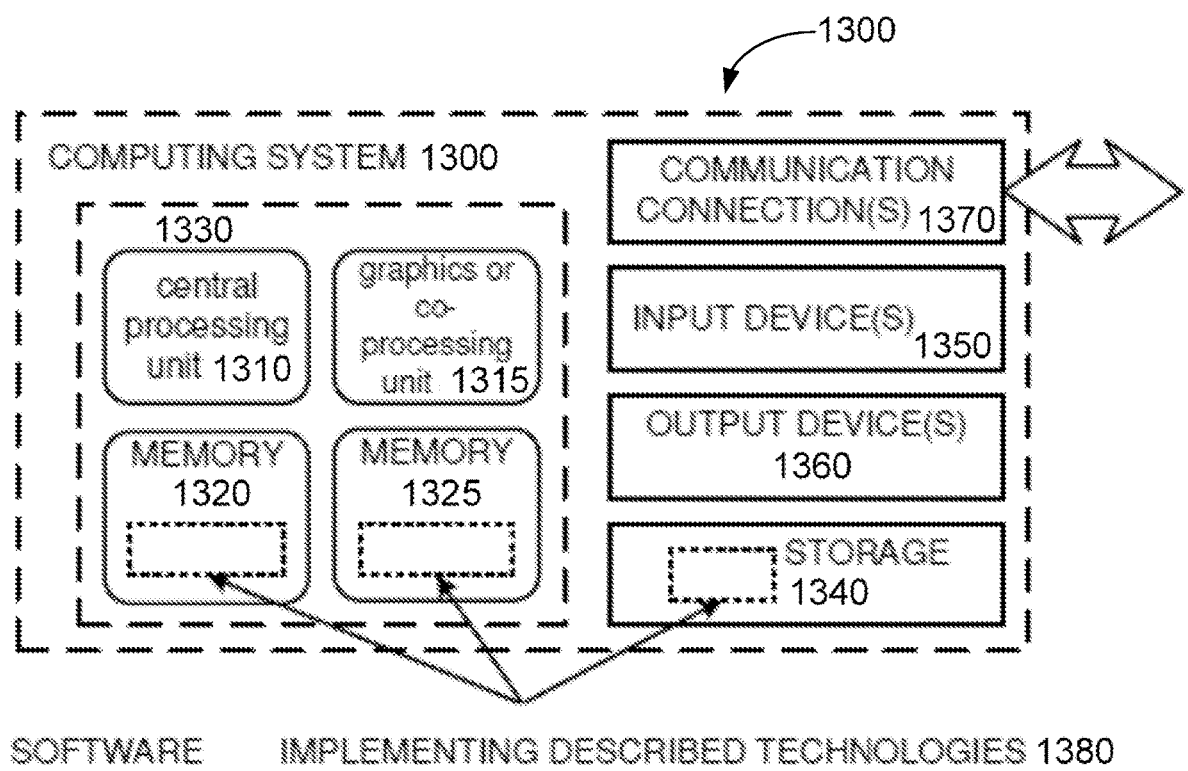
FIG. 13 is a schematic diagram of a computing system.

FIG. 13 depicts a generalized example of a suitable computing system 1300 in which the described innovations may be implemented. The computing system 1300 is not intended to suggest any limitation as to scope of use or functionality, as the innovations may be implemented in diverse general-purpose or special-purpose computing systems.

With reference to FIG. 13, the computing system 1300 includes one or more processing units 1310 and 1315 and memory 1320 and 1325. In FIG. 13, this basic configuration 1330 is included within a dashed line. The processing units 1310 and 1315 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320 and 1325 may be volatile memory (e.g., registers, cache, RAM), non-volatile memory (e.g., ROM, EEPROM, flash memory, etc.), or some combination of the two, accessible by the processing unit(s). The memory 1320 and 1325 stores software 1380 implementing one or more innovations described herein, in the form of computer-executable instructions suitable for execution by the processing unit(s).

A computing system may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. For video encoding, the input device(s) 1350 may be a camera, video card, TV tuner card, or similar device that accepts video input in analog or digital form, or a CD-ROM or CD-RW that reads video samples into the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). Computer-readable storage media are tangible media that can be accessed within a computing environment (one or more optical media discs such as DVD or CD, volatile memory (such as DRAM or SRAM), or nonvolatile memory (such as flash memory or hard drives)). By way of example and with reference to FIG. 13, computer-readable storage media include memory 1320 and 1325, and storage 1340. The term computer-readable storage media does not include signals and carrier waves. In addition, the term computer-readable storage media does not include communication connections, such as 1370.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

What is claimed is:

1. A method, implemented by a computing device comprising one or more hardware processors, for calculating heavy hitters of a multiplicity of types having M-bit binary representations, comprising:
    defining, by the one or more hardware processors, a heavy-hitter criterion, $\eta$, for a frequency of a prefix to classify a node corresponding to the prefix as a heavy hitter;
    looping over row j in a binary prefix tree data structure from 1 to M, wherein row j of the binary prefix tree data structure comprises nodes corresponding to most significant j-bit binary prefixes of the M-bit binary type representations:
        receiving, from each user device of a plurality of user devices, a local differentially private report on only a most significant j-bits of an M-bit binary type representation, of the M-bit binary type representations, associated with the user device;
        processing nodes k in row j of the binary prefix tree data structure comprising:
            calculating a frequency f(j,k) of node (j,k) from the received reports using a frequency oracle;
            pruning all nodes in row j having frequencies less than a heavy hitter criterion; and
            if j<M, for each remaining node in row j, creating child nodes; and
    determining a heavy hitters distribution using the frequency oracle.

2. The method of claim 1, wherein each user device in a population G of n user devices holds a type, the types having M-bit binary representations.

3. The method of claim 2, further comprising selecting a plurality of groups $G_1$ to $G_M$ from the population G of n user devices.

4. The method of claim 3, wherein at least one of the groups $G_1$ to $G_M$ comprises all members of the population G.

5. The method of claim 3, wherein each group $G_j$ in the plurality of groups $G_1$ to $G_M$ comprises a fraction of 1/M of the population G.

6. The method of claim 3, wherein each member of the population G is a member of exactly one group $G_j$ in the plurality of groups $G_1$ to $G_M$.

7. The method of claim 5, further comprising sending requests to each user device in the group $G_j$ to send a local differentially private report on the most significant j-bits in the M-bit binary representations of the types held by each user device.

8. The method of claim 1, wherein determining the heavy hitters distribution using the frequency oracle comprises:
identifying all remaining nodes of row M as the heavy hitters.

9. The method of claim 1, wherein the types comprise one or more of: URLs accessible using a browser, music selections accessible from a music server, and new words appearing in e-mails.

10. A method, implemented by a computing device, comprising one or more hardware processors, for calculating heavy hitters of a multiplicity of types, each user device in a population G of n user devices holding a type, the types having M-bit binary type representations, the method comprising:
configuring a binary prefix tree data structure to have M+1 rows numbered downwards from j=0 to M, row j=0 comprising a single node corresponding to the M-bit binary type representations of the multiplicity of types, each successive row j in the binary prefix tree data structure comprising $2^j$ nodes, each node in row j corresponding to a most significant j-bit prefix of a unique M-bit binary type representation of the multiplicity of the M-bit binary type representations;
defining, by the one or more hardware processors, a heavy-hitter criterion, for a frequency of a prefix to classify a node corresponding to the prefix as a heavy hitter;
selecting a plurality of groups $G_1$ to $G_M$ from the population G of n user devices;
looping over nodes k in row j of the binary prefix tree data structure from 1 to M:
receiving local differentially private reports on only the most significant j-bits in the M-bit binary representations of the types held by each user device;
looping for all nodes marked as heavy hitters in row j of the binary prefix tree data structure:
calculating a frequency f(j,k) of node (j,k) from the received local differentially private reports using a frequency oracle;
comparing the frequency f(j,k) to the heavy-hitter criterion η;
if f(j,k)<η, removing the marking of heavy hitter from node (j,k); and
if j<M and if f(j,k)≥η, marking child nodes (j+1,2k) and (j+1,2k+1) as heavy hitters; and
if j<M, removing all heavy hitter markings from nodes in row j; and
determining a heavy hitters distribution using the frequency oracle applied to type data from all n users at only nodes in row M marked as heavy hitters.

11. The method of claim 10, wherein at least one of the groups $G_1$ to $G_M$ comprises all members of the population G.

12. The method of claim 10, wherein each group $G_j$ in the plurality of groups $G_1$ to $G_M$ comprises a fraction of 1/M of the population G.

13. The method of claim 12, wherein each member of the population G is a member of exactly one group $G_j$ in the plurality of groups $G_1$ to $G_M$.

14. The method of claim 13, further comprising sending requests to each user device in the group $G_j$ to send a local differentially private report on the most significant j-bits in the M-bit binary representations of the types held by each user device.

15. The method of claim 10, wherein the types comprise one or more of: URLs accessible using a browser, music selections accessible from a music server, and new words appearing in e-mails.

* * * * *